United States Patent
Sinha et al.

(10) Patent No.: US 10,157,290 B1
(45) Date of Patent: Dec. 18, 2018

(54) SYSTEMS AND METHODS FOR ENCRYPTING FILES

(71) Applicant: Symantec Corporation, Mountain View, CA (US)

(72) Inventors: Nikhil Sinha, Campbell, CA (US); Earle Lowe, Roseville, CA (US); Sumit Sarin, Pune (IN); Sumesh Jaiswal, Pune (IN)

(73) Assignee: Symantec Corporation, Mountain View, CA (US)

( * ) Notice: Subject to any disclaimer, the term of this patent is extended or adjusted under 35 U.S.C. 154(b) by 9 days.

(21) Appl. No.: 15/730,005

(22) Filed: Oct. 11, 2017

(51) Int. Cl.
  *G06F 21/62* (2013.01)
  *H04L 29/06* (2006.01)

(52) U.S. Cl.
  CPC ...... *G06F 21/6218* (2013.01); *H04L 63/0435* (2013.01); *H04L 63/0442* (2013.01); *H04L 63/0464* (2013.01); *H04L 63/061* (2013.01); *H04L 63/1408* (2013.01); *G06F 2221/2107* (2013.01)

(58) Field of Classification Search
  CPC ... H04L 63/0823; H04L 9/321; H04L 9/3247; H04L 9/3263; H04L 9/3297; H04L 63/0807; H04L 63/168; G06F 2009/45587; G06F 9/45558
  See application file for complete search history.

(56) References Cited

U.S. PATENT DOCUMENTS

| | | | |
|---|---|---|---|
| 8,356,357 B1 * | 1/2013 | Barile | H04L 9/3247 705/51 |
| 9,529,733 B1 | 12/2016 | Sokolov et al. | |
| 9,794,256 B2 * | 10/2017 | Kiang | H04L 63/10 |
| 2007/0124583 A1 | 5/2007 | Andersson et al. | |
| 2010/0125891 A1 | 5/2010 | Baskaran | |
| 2010/0268934 A1 * | 10/2010 | Hinton | H04L 63/0428 713/152 |
| 2012/0173880 A1 * | 7/2012 | Swaminathan | G06F 21/10 713/189 |
| 2013/0129085 A1 * | 5/2013 | Swaminathan | H04L 9/0637 380/42 |
| 2013/0219176 A1 * | 8/2013 | Akella | H04L 63/0815 713/165 |

(Continued)

OTHER PUBLICATIONS

Microsoft: Azure Information Protection User Guide; https://docs.microsoft.com/en-us/information-protection/rms-client/client-user-guide; Feb. 8, 2017.

*Primary Examiner* — Joseph P Hirl
*Assistant Examiner* — Sayed Aresh Beheshti Shirazi
(74) *Attorney, Agent, or Firm* — Fisher Broyels, LLP

(57) ABSTRACT

The disclosed computer-implemented method for encrypting files may include (i) detecting an event within a network that triggers an encryption of a file on the network, (ii) performing, in response to detecting the event, both encrypting the file to a file encryption key and encrypting the file encryption key to a public key of a source of the file, (iii) receiving, from a client, a file access request that includes the encrypted file encryption key, and (iv) transmitting, in response to determining that the client is authorized to access the file, a re-encrypted file encryption key to the client to enable the client to access the file. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2013/0275752 | A1* | 10/2013 | Zhang | H04L 9/008 713/167 |
| 2014/0007246 | A1* | 1/2014 | Nelson | H04L 63/12 726/26 |
| 2014/0026182 | A1* | 1/2014 | Pearl | G06F 21/60 726/1 |
| 2014/0068254 | A1* | 3/2014 | Scharf | G06F 21/6209 713/165 |
| 2014/0155028 | A1* | 6/2014 | Daniela | H04W 12/02 455/411 |
| 2014/0161251 | A1* | 6/2014 | Yoshida | H04L 9/0825 380/44 |
| 2015/0143127 | A1* | 5/2015 | Gorbach | H04L 9/321 713/175 |
| 2016/0034702 | A1* | 2/2016 | Sikka | G06F 21/6218 726/27 |
| 2016/0357980 | A1* | 12/2016 | Balasubramanian | G06F 21/6218 |
| 2016/0380767 | A1* | 12/2016 | Hayashi | H04L 9/14 380/45 |

\* cited by examiner

SYSTEMS AND METHODS FOR ENCRYPTING FILES

BACKGROUND

Modern corporate enterprise organizations sometimes experience a "roving data protection" problem. In these organizations, employees can share files externally through emails, cloud applications such as DROPBOX and BOX, and removable media such as USB sticks. Each of these channels creates a potential vulnerability in which sensitive data can be lost or security can be compromised. Specifically, IT administrators have little or no control over data after the data leaves a corporate perimeter. These administrators may attempt to address some of these potential vulnerabilities by encrypting data to prevent unauthorized access to the data. Nevertheless, traditional systems for encrypting an organization's data may not be optimized along one or more dimensions, as discussed further below. The instant disclosure, therefore, identifies and addresses a need for improved systems and methods for encrypting files.

SUMMARY

As will be described in greater detail below, the instant disclosure describes various systems and methods for encrypting files. In one example, a computer-implemented method for detecting security incidents may include (i) detecting an event within a network that triggers an encryption of a file on the network, (ii) performing, in response to detecting the event, (a) encrypting the file to a file encryption key and (b) encrypting the file encryption key to a public key of a source of the file, (iii) receiving, from a client, a file access request that includes the encrypted file encryption key, (iv) performing, in response to determining that the client is authorized to access the file: (a) initiating a decryption of the encrypted file encryption key using a private key of the source of the file, (b) re-encrypting the file encryption key using a public key of the client, and (c) transmitting the re-encrypted file encryption key to the client to enable the client to access the file.

In one embodiment, the event within the network is detected by a data loss prevention system and/or a cloud access security broker. In one embodiment, the file encryption key may include a symmetrical file encryption key. In one embodiment, the file encryption key is randomly generated.

In some examples, initiating the decryption of the encrypted file encryption key using the private key of the source of the file may include requesting that the source of the file perform the decryption. In some examples, requesting that the source of the file perform the decryption is performed without exposing the private key of the source of the file to a cloud computing network that is external to the source. In one embodiment, re-encrypting the file encryption key using the public key of the client is performed in response to receiving the public key from the client as part of the file access request.

In some examples, the computer-implemented method may further include transmitting to the client, in response to determining that the client is authorized to access the file, a cloud security policy that governs access to the file. In one embodiment, the computer-implemented method may further include dynamically updating the cloud security policy based on changing contents of the file, an identity of the client, a time zone in which the client is located, and/or a geolocation of the client. In one embodiment, the cloud security policy specifies a limit on (i) printing the file, (ii) copy and paste access to contents of the file, (iii) editing of the file, and/or (iv) offline viewing of the file.

In one embodiment, a system for implementing the above-described method may include (i) a detection module, stored in memory, that detects an event within a network that triggers an encryption of a file on the network, (ii) a performance module, stored in memory, that performs, in response to detecting the event: (a) encrypting the file to a file encryption key and (b) encrypting the file encryption key to a public key of a source of the file, (iii) a reception module, stored in memory, that receives, from a client, a file access request that includes the encrypted file encryption key, (iv) where the performance module is further configured to perform, in response to determining that the client is authorized to access the file: (a) initiating a decryption of the encrypted file encryption key using a private key of the source of the file, (b) re-encrypting the file encryption key using a public key of the client, and (c) transmitting the re-encrypted file encryption key to the client to enable the client to access the file, and (v) at least one physical processor configured to execute the detection module, the performance module, and the reception module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an event within a network that triggers an encryption of a file on the network, (ii) perform, in response to detecting the event, (a) encrypting the file to a file encryption key and (b) encrypting the file encryption key to a public key of a source of the file, (iii) receive, from a client, a file access request that includes the encrypted file encryption key, and (iv) perform, in response to determining that the client is authorized to access the file: (a) initiating a decryption of the encrypted file encryption key using a private key of the source of the file, (b) re-encrypting the file encryption key using a public key of the client, and (c) transmitting the re-encrypted file encryption key to the client to enable the client to access the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
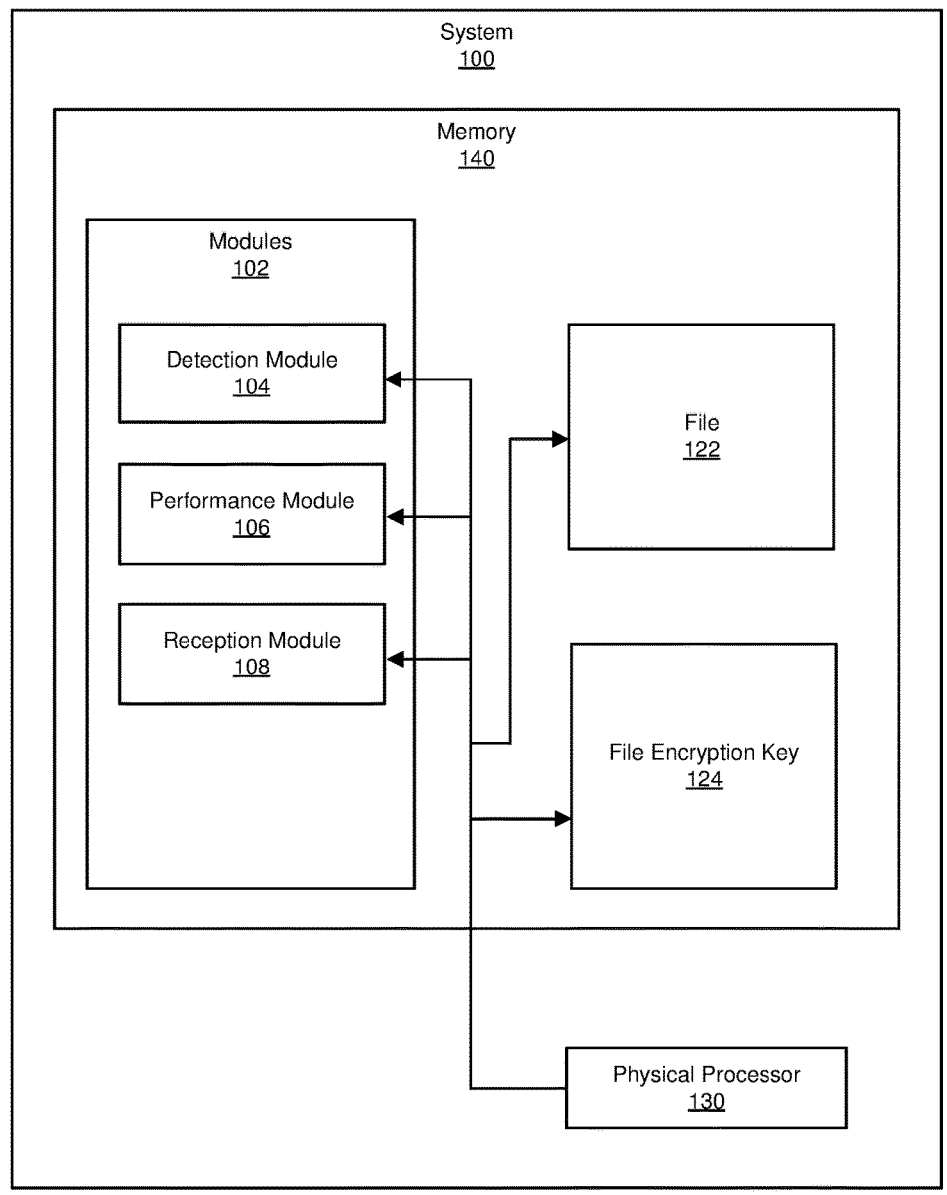
FIG. 1 is a block diagram of an example system for encrypting files.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for encrypting files. As discussed further below, the disclosed systems and methods may generally improve upon systems that automatically protect data by encrypting the data prior to delivering the data to an intended recipient. More specifically, the disclosed systems and methods may leverage asymmetric cryptography by providing a public and private key pair to both the sender and the receiver of a file. The disclosed systems and methods may protect the file by encrypting a file encryption key with the sender's public key, and later decrypting the file encryption key using the sender's private key, as well as further encrypting the file encryption key with the recipient's public key, and later decrypting the file encryption key using the recipient's private key. In some embodiments, these two stages of encryption and decryption may effectively protect the private key of the sender and of the recipient from being exposed to any network outside of the respective owner's control.

Figure 2:
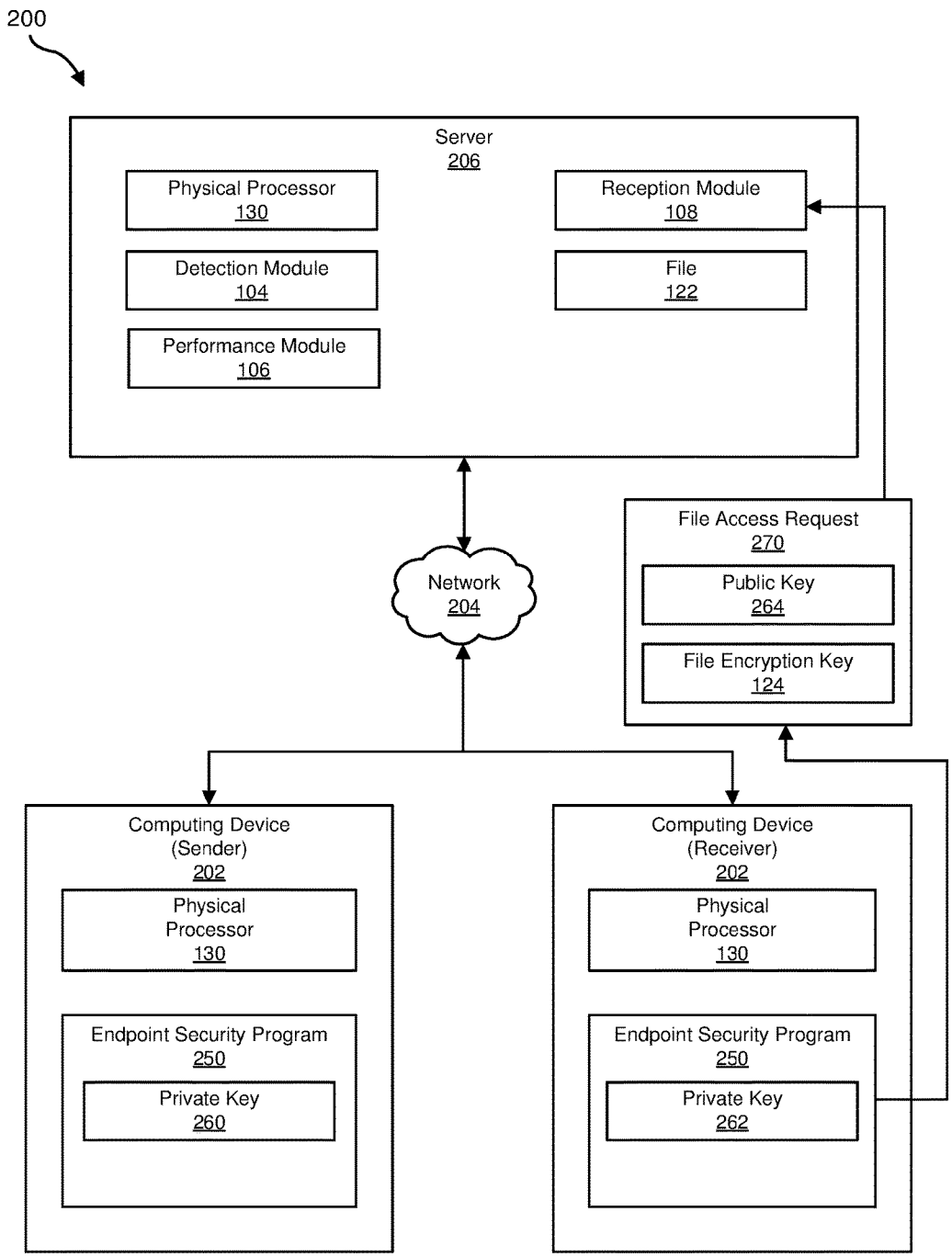
FIG. 2 is a block diagram of an additional example system for encrypting files.

The following will provide, with reference to FIGS. 1-2, detailed descriptions of example systems for encrypting files. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for detecting security incidents. As illustrated in this figure, example system 100 may include one or more modules 102 for performing one or more tasks. For example, and as will be explained in greater detail below, example system 100 may include a detection module 104 that detects an event within a network that triggers an encryption of a file on the network, such as a file 122. Example system 100 may additionally include a performance module 106 that performs, in response to detecting the event: (a) encrypting the file to a file encryption key 124 and (b) encrypting file encryption key 124 to a public key of a source of the file. Exemplary system 100 may additionally include a reception module 108 that receives, from a client, a file access request that includes the encrypted file encryption key. Within example system 100, performance module 106 may also be configured to perform, in response to determining that the client is authorized to access the file: (a) initiating a decryption of the encrypted file encryption key using a private key of the source of the file, (b) re-encrypting the file encryption key using a public key of the client, and (c) transmitting the re-encrypted file encryption key to the client to enable the client to access the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate encrypting files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to encrypt files.

For example, and as will be described in greater detail below, detection module 104 may detect an event within network 204 that triggers an encryption of file 122 on network 204. Performance module 106 may perform, in response to detecting the event: (a) encrypting file 122 to file encryption key 124 and encrypting file encryption key 124 to a public key (not shown in FIG. 2) of a source of the file. In this example, the source of the file may correspond to an instance of computing device 202 (i.e., the "sender" in FIG. 2) that is transmitting the file. Reception module 108 may receive, from a client or intended recipient of the file (e.g., the "receiver" instance of computing device 202 in FIG. 2), a file access request 270 that includes encrypted file encryption key 124. File access request 270 may also optionally include a copy of a public key 264 of the client. Performance module 106 may perform, in response to determining that the client is authorized to access file 122: (a) initiating a decryption of encrypted file encryption key 124 using a private key 260 of the source of file 122, (b) re-encrypting file encryption key 124 using public key 264 of the client, and (c) transmitting re-encrypted file encryption key 124 to the client to enable the client to access file 122.

As further shown in this figure, system 200 may also further include an instance of an endpoint security program 250 at each of the "sender" and the "receiver" instances of computing device 202. The instances of endpoint security program 250 may store private key 260 and private key 262, respectively. The instances of endpoint security program 250 may also send and/or receive one or more items of data to, or from, server 206, such as a newly generated file data manifest (described further below in connection with step 304) and/or file access request 270, in accordance with method 300.

Computing device 202 generally represents any type or form of computing device capable of reading computer-executable instructions. In one example, computing device 202 may correspond to an endpoint computing device of a client or customer within a corporate enterprise organization that is protected by a data loss prevention service or cloud access security broker. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of performing, or facilitating the performance of, method 300, as discussed further below. In some examples, server 206 may correspond to a centralized backend security server of a third-party security service that provides a data loss prevention service and/or functions as a cloud access security broker. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), por-tions of one or more of the same, variations or combinations of one or more of the same, and/or any other suitable network.

Figure 3:
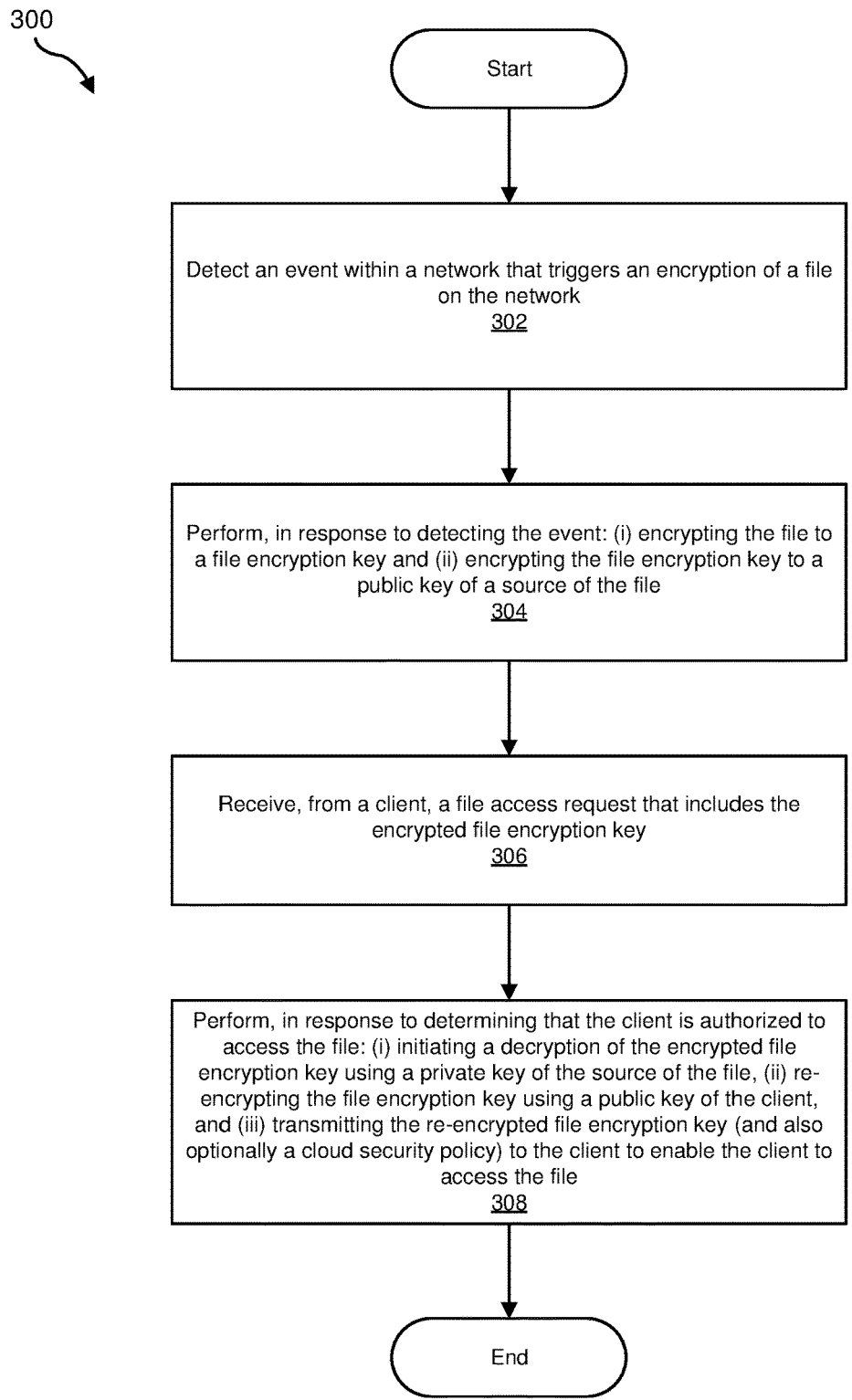
FIG. 3 is a flow diagram of an example method for encrypting files.

FIG. 3 is a flow diagram of an example computer-implemented method 300 for encrypting files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect an event within a network that triggers an encryption of a file on the network. For example, detection module 104 may, as part of server 206 in FIG. 2, detect an event within network 204 that triggers an encryption of file 122 on network 204.

Detection module 104 may detect the event within the network in a variety of ways. In some examples, detection module 104 may be part of a data loss prevention system and/or a cloud access security broker. Accordingly, detection module 104 may detect the event within the network as part of the monitoring and detection functions performed by a data loss prevention system and/or cloud access security broker. For example, the event within the network may include an attempt to transmit a file or network packet. In more specific examples, the event within the network may include any attempt to transmit a file, or other data, outside of a protected network. In these examples, a user or program may attempt to transmit a file, or other data, by transmitting a message (i.e., text message, forum message, email message, etc.), copying or replicating the file to an external service such as DROPBOX, BOX and/or copying the data to an external or peripheral device, such as a USB stick. In further examples, the event within the network may include a policy violation of a data loss prevention system.

At step 304, one or more of the systems described herein may perform, in response to detecting the event both: encrypting the file to a file encryption key and encrypting the file encryption key to a public key of a source of the file. For example, performance module 106 may, as part of server 206 in FIG. 2, perform, in response to detecting the event: encrypting file 122 to file encryption key 124 and encrypting file encryption key 124 to a public key of a source of the file.

As used herein, the phrase "encrypting the file to a key" generally refers to encrypting the file (a) based on the key and/or (b) in a manner such that the key (e.g., a symmetric key), or its pair within an asymmetric key pair, may decrypt the file. In some examples, such a key may correspond to a file encryption key (i.e., file encryption key 124). The term "file encryption key" may generally refer to a key that is used to encrypt or decrypt a file, as distinct from encrypting or decrypting something else. Similarly, such a key may correspond to a public key and/or a private key according to asymmetric cryptography (e.g., within a public-key infrastructure). As further shown in FIG. 2, these keys may include public key 264, private key 260, private key 262, as well as a public key corresponding to the source or sender of the file.

Similarly, the phrase "public key of a source," and related phrases, such as "private key of the source" and "public key of the client" generally refers to a corresponding key, within a public-private key pair, as used within an asymmetric cryptographic protocol, that has been previously assigned, or designated, to the source or client, respectively. In some examples, each source or client may be designated a single public-private key pair. In alternative examples, one or more of these may be designated multiple public-private key pairs. Moreover, as used herein, the term "source of a file" generally refers to a transmitter of the file. Similarly, as used herein, the term "client" or "receiver of a file" generally refers to an individual, or corresponding computing device, that receives the transmitted file (e.g., receives the transmitted file either directly through a message, such as an email message, or indirectly through an intermediary such as a cloud storage service and/or peripheral storage device, such as a USB stick). In general, the source and/or client may correspond to user accounts that are registered with system 100 and/or system 200, as discussed further below.

Performance module 106 may perform step 304 in a variety of ways. In general, performance module 106 may perform step 304 in response to the detection of the event within the network at step 302. In response, performance module 106 may both (a) encrypt file 122 to file encryption key 124 and/or (b) encrypt file encryption key 124 to a public key of the source or sender of the file. Performance module 106 may perform features (a) and (b) in an arbitrary serial order or in parallel. In some examples, file encryption key 124 may include a symmetric encryption key. In additional or alternative examples, file encryption key 124 may be randomly generated and/or randomly applied to file 122.

In some examples, performance module 106 may effectively intercept the transmission of file 122 to a recipient, such as the recipient corresponding to the "receiver" instance of computing device 202 shown in FIG. 2, a recipient corresponding to a cloud storage service, and/or a recipient corresponding to a peripheral storage device. Performance module 106 may also substitute a newly generated file data manifest for the original unencrypted file. The newly generated file data manifest may include encrypted file 122, encrypted file encryption key 124, and/or further metadata describing contents of file 122 and/or one or more protocols for decrypting file 122. In some examples, the file data manifest may insert the encrypted file encryption key as a part of the header of the file data manifest and/or the encrypted file. Furthermore, performance module 106 may optionally register the file (e.g., a document) with system 200 (e.g., a data loss prevention system and/or cloud access security broker), thereby indicating that a data loss prevention policy was violated.

Subsequently, performance module 106 may transmit, or deliver, the newly generated file data manifest to the original intended recipient or target of file 122, as a substitute for the original unencrypted file. In the example of a message delivered to another user or computing system (e.g., an email or text message), performance module 106 may deliver the substituted file data manifest to the intended recipient. Alternatively, in the example of exfiltrating data to an external source (e.g., without necessarily a specific intended recipient), performance module 106 may deliver the substituted file data manifest to the intended external storage, such as a peripheral device or cloud data storage service such as BOX or DROPBOX. Upon receiving the substituted file data manifest (e.g., either from the substituted email/message and/or from downloading or accessing the substituted file from the external source), an instance of endpoint security program 250 at the intended recipient (i.e., the "receiver" instance of computing device 202 shown in FIG. 2) may leverage, or apply, one or more items of data within the newly generated file data manifest to successfully request access to the original unencrypted file, in accordance with method 300, as described further below. More specifically, an instance of endpoint security program 250 at the recipient may transmit, to server 206, file access request 270, which may further include public key 264 and file encryption key 124, as further discussed above.

At step 306, one or more of the systems described herein may receive, from a client, a file access request that includes the encrypted file encryption key. For example, at step 306, reception module 108 may receive, from the "receiver" instance of computing device 202 shown in FIG. 2, file access request 270, which may further include file encryption key 124 (which has previously been encrypted to a public key of the "sender" computing device at step 304). In some examples, file access request 270 may also optionally include a copy of public key 264, as further described above. As used herein, the term "file access request" generally refers to a request to access a file. The inclusion of file encryption key 124 within file access request 270 may indicate that file access request 270 corresponds to a request to access file 122 rather than another file.

In the above example, file access request 270 includes an actual copy of encrypted file encryption key 124. In alternative examples, file access request 270 may instead include an identifier of encrypted file encryption key 124, which server 206 may subsequently use to identify a local copy of encrypted file encryption key 124 and then transmit a re-encrypted copy of file encryption key 124, in accordance with step 308, as discussed further below.

Reception module 108 may receive file access request 270 in a variety of ways. In general, reception module 108 may receive file access request 270 in response to the performance of step 302 and/or 304. More specifically, in some examples, reception module 108 may receive file access request 270 in response to a recipient or downloader of the original unencrypted file (i.e., the "receiver" instance of computing device 202 shown in FIG. 2) receiving the substituted and newly generated file data manifest, as described above, which may include encrypted file 122, encrypted file encryption key 124, and/or corresponding metadata. A user or program at "receiver" instance of computing device 202 may detect that the newly generated file data manifest includes encrypted data that may be decrypted prior to a user or program accessing that data. Accordingly, the user or program (e.g., the instance of endpoint security program 250) may transmit file access request 270 to server 206 to request that the data be decrypted. More specifically, the user or program may transmit file access request 270 to request access to file encryption key 124, which the user or program may then further use to decrypt file 122, as described further below in connection with step 308 of method 300.

At step 308, one or more of the systems described herein may perform, in response to determining that the client is authorized to access the file: (a) initiating a decryption of the encrypted file encryption key using a private key of the source of the file, (b) re-encrypting the file encryption key using a public key of the client, and (c) transmitting the re-encrypted file encryption key to the client to enable the client to access the file. For example, at step 308, performance module 106 may perform, in response to determining that the client is authorized to access file 122: (a) initiating a decryption of encrypted file encryption key 124 using private key 260 of the source of file 122, (b) re-encrypting file encryption key 124 using public key 264 of the client, and (c) transmitting re-encrypted file encryption key 124 to the client to enable the client to access file 122.

Performance module 106 may perform step 308 in a variety of ways. In some examples, performance module

106 may additionally determine that the client is authorized to access the file. Alternatively, in some examples, another suitable module within system 200 may make this determination. In either case, the determination may be based on one or more factors that indicate whether file access request 270 should be granted (e.g., should be granted according to a predefined data loss prevention policy and/or cloud access security broker program policy). These factors may include: (A) the client's identity, (B) the client's device type, (C) the client's geolocation, and (D) the specific type of data loss prevention policy violation, or other security policy violation, detected at step 302, which triggered one or more of the encryption features performed at step 304 and/or 308. Performance module 106 may enforce one or more of these limitations by maintaining the decrypted document within a controlled environment using one or more hooks to intercept and dynamically block corresponding actions, as listed above.

In response to the determination that the client is authorized to access the file, performance module 106 may initiate the decryption of the encrypted file encryption key in a variety of ways. In some examples, performance module 106 within server 206 may possess access to a copy of the private key of the source of the file. In these examples, performance module 106 may decrypt the encrypted file encryption key using its own copy of the private key of the source of the file.

In alternative examples, the source of the file may maintain private ownership of the private key, such that performance module 106 within server 206 does not possess a copy of the private key. In these alternative examples, performance module 106 may request that the source of the file (e.g., "sending" instance of computing device 202 shown in FIG. 2) perform the decryption of the encrypted file encryption key using the source's own copy of the private key. For example, performance module 106 may transmit file encryption key 124, which previously had been encrypted using a public key of the source of the file, to the source of the file, where the source of the file may decrypt file encryption key 124 using a private key. In these alternative examples, performance module 106 may request that the source of the file perform the decryption without exposing the private key of the source of the file to a cloud computing network that is external to the source (i.e., without compromising the source's private or exclusive ownership of, access to, and/or control of the private key).

In additional examples, performance module 106 may re-encrypt the file encryption key using the public key of the client in response to receiving the public key from the client as part of the file access request. For example, as shown in FIG. 2, the "receiver" instance of computing device 202 may transmit file access request 270 to server 206, and file access request 270 may optionally include a copy of public key 264. In these examples, performance module 106 may use the copy of public key 264 that is included within file access request 270 to re-encrypt file encryption key 124 after the previous decryption of file encryption key 124 using private key 260, as discussed above. In alternative examples, performance module 106 may use a copy of public key 264 that performance module 106 obtained outside of file access request 270. For example, performance module 106 may obtain a copy of public key 264 from a public website or other external source.

In further embodiments, in addition to transmitting the re-encrypted file encryption key to the "receiver" instance of computing device 202, performance module 106 may also transmit, in response to determining that the client is authorized to access the file, a cloud security policy that governs access to the file. In response to receiving the cloud security policy, the client may further apply that transmitted cloud security policy to the file. In some examples, the cloud security policy specifies a limit on at least one of: (i) printing the file, (ii) copy and paste access to contents of the file, (iii) editing of the file, and/or (iv) offline viewing of the file. In other examples, the cloud security policy may specify a limit on any other suitable access channel, access mechanism, and/or output function related to the file (e.g., reading, writing, editing, copying, displaying, executing, etc.). In this manner, a centralized security server, such as server 206, may dynamically maintain a centralized cloud security policy for a specific file. Performance module 106, within server 206, may dynamically update the cloud security policy for a specific file as circumstances change over time. In some specific examples, performance module 106 may dynamically update the cloud security policy based on changing contents of the file, an identity of the client, a time zone in which the client is located, a geolocation of the client, and/or any other suitable characteristic. Performance module 106 may also transmit a current, or updated, cloud security policy in tandem with transmitting a re-encrypted file encryption key in accordance with step 308, as discussed further above. Accordingly, performance module 106 may enable the "receiver" instance of computing device 202 to receive, and apply, a continuously updated, up-to-date, and/or centrally managed cloud security policy for a specific file, such as file 122.

Figure 4:
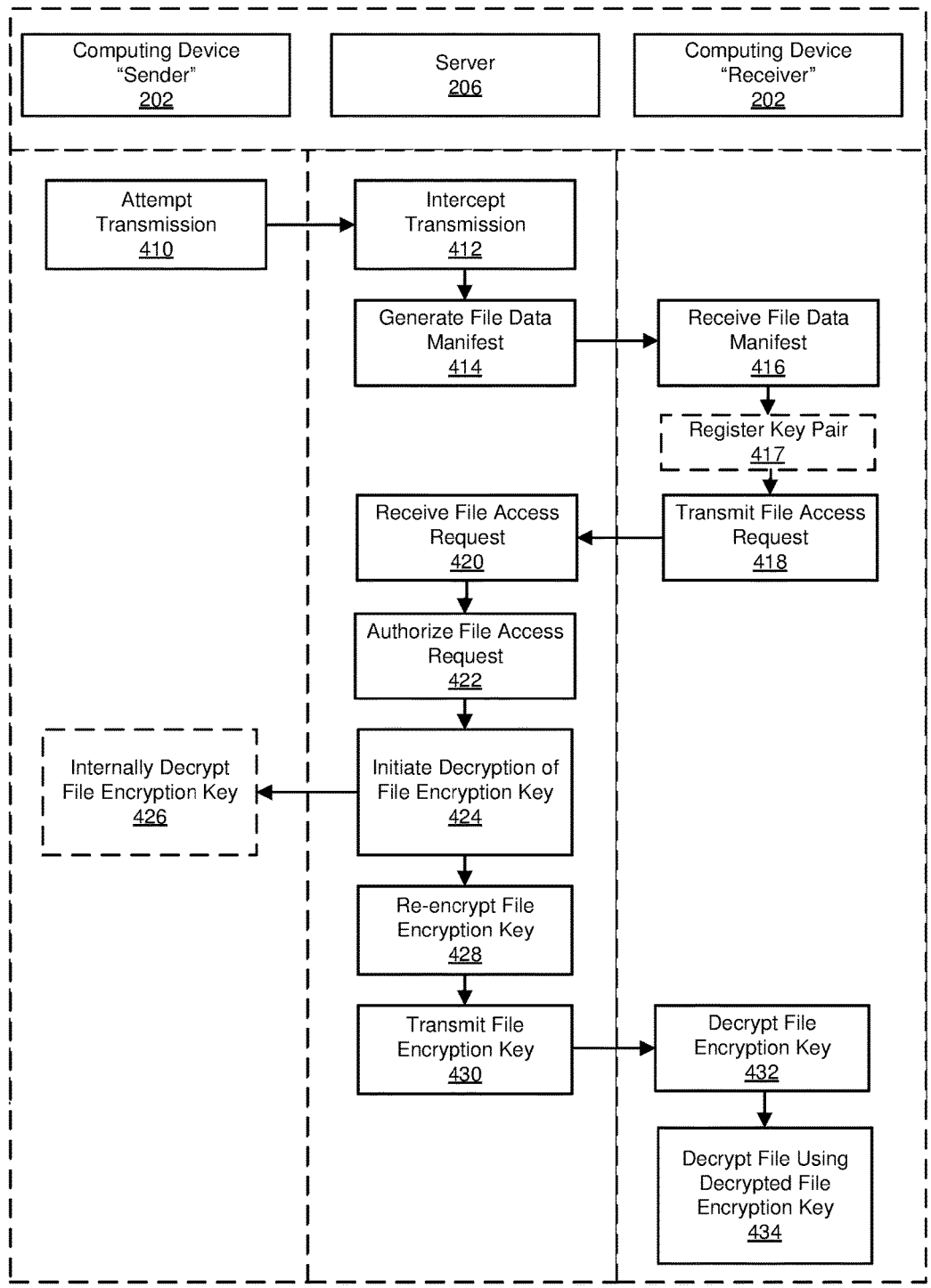
FIG. 4 is a workflow diagram indicating how one computing device may transmit a file to another computing device according to an example method for encrypting files.

FIG. 4 illustrates an example workflow indicating how one or more items of information are sent and/or received between each of the "sender" instance of computing device 202, server 206, and the "receiver" instance of computing device 202, as first described above in connection with FIG. 2. The example of FIG. 4 may elaborate on method 300, as described above in connection with FIG. 3, while further highlighting specific features, or steps, that are performed by each of the instances of computing device 202, rather than focusing substantially on server 206, as in the case of method 300.

As shown in FIG. 4, the workflow may begin at a step 410, at which point the "sender" instance of computing device 202 may attempt to transmit an original unencrypted file or other data. For example, the sender may attempt to send this file by email or other network message. Alternatively, the sender may attempt to exfiltrate the file from a controlled or secure network by copying or transmitting the file to a cloud storage service, such as DROPBOX, BOX, and/or copying or transmitting the file to a peripheral device, such as a mobile peripheral storage device (e.g., a USB disk). In response, at step 412, detection module 104 at server 206 may detect the attempted transmission, and intercept the transmission, as further described above in connection with step 302. Detection module 104 may detect any event that may trigger encryption of the file, including any data loss prevention policy violation and/or cloud access security broker policy violation, and/or any attempt to exfiltrate an item of data over a network or peripheral device.

In response to intercepting the attempted transmission at step 412, performance module 106 may further generate, at step 414, a file data manifest, as described above in connection with step 304 of method 300. The file data manifest may include the original file after being encrypted to a symmetric file encryption key, the file encryption key encrypted to a public key of the sender of the file, and/or metadata describing contents or other features of the file. At step 414, performance module 106 may also transmit the newly generated file data manifest to the "receiver" instance of computing device 202. Accordingly, at step 416, the "receiver" instance of computing device 202 may receive the newly generated file data manifest. Optionally, in response, at step 417, the instance of endpoint security program 250 at the receiver may register with server 206 and/or register a public-private key pair (this step may be skipped if it has been previously performed, for example if the step has been previously performed in response to receiving an earlier filed data manifest for a different file). Additionally, in response, at step 418, the instance of endpoint security program 250 at the receiver may transmit a file access request, such as file access request 270, to server 206. Subsequently, reception module 108 at server 206 may, at step 420, receive file access request 270 transmitted from the receiver at step 418, as further described above in connection with step 306 of method 300.

After reception module 108 receives file access request 270 at step 420, performance module 106, or any other suitable module within system 200, may determine whether to grant file access request 270. Accordingly, performance module 106 may subsequently authorize file access request 270 at step 422. In response, performance module 106 may, at step 424, initiate decryption of the encrypted file encryption key using a private key of the source of the file (i.e., private key 260). Optionally, at step 426, performance module 106 may transmit a request to the "sender" instance of computing device 202 to internally decrypt the encrypted file encryption key using private key 260, thereby preventing private key 260 from being exposed to a network external to the sender of the file and/or being exposed to server 206 and/or the receiver of the file. In this optional example, the sender of the file may respond by internally decrypting the file encryption key and transmitting the decrypted file encryption key back to server 206 prior to step 428, as discussed further below. In other examples, performance module 106 may maintain its own copy of private key 260 and use this copy of private key 260 to decrypt the encrypted file encryption key at step 424.

Subsequently, at step 428, performance module 106 may re-encrypt the file encryption key using a public key of the receiver of the file. Optionally, performance module 106 may have previously received a copy of the public key as part of receiving file access request 270, as discussed above in connection with step 420. Furthermore, as shown in FIG. 4, performance module 106 may also, at step 430, transmit the re-encrypted file encryption key to the receiver of the file. In response, at step 432, the "receiver" instance of computing device 202 may decrypt the file encryption key using its own private key, which it may maintain internally and exclusively. Moreover, at step 434, the receiver may further decrypt the encrypted file using the file encryption key that it previously decrypted at step 432, thereby successfully providing access to the file to a user or program at the "receiver" instance of computing device 202.

As discussed above, the disclosed systems and methods may generally improve upon systems that automatically protect data by encrypting the data prior to delivering the data to an intended recipient. More specifically, the disclosed systems and methods may leverage asymmetric cryptography by providing a public and private key pair to both the sender and the receiver of a file. The disclosed systems and methods may protect the file by encrypting a file encryption key with the sender's public key, and later decrypting the file encryption key using the sender's private key, as well as further encrypting the file encryption key with the recipient's public key, and later decrypting the file encryption key using the recipient's private key. In some embodiments, these two stages of encryption and decryption may effectively protect the private key of the sender and of the recipient from being exposed to any network outside of the respective owner's control.

Figure 5:
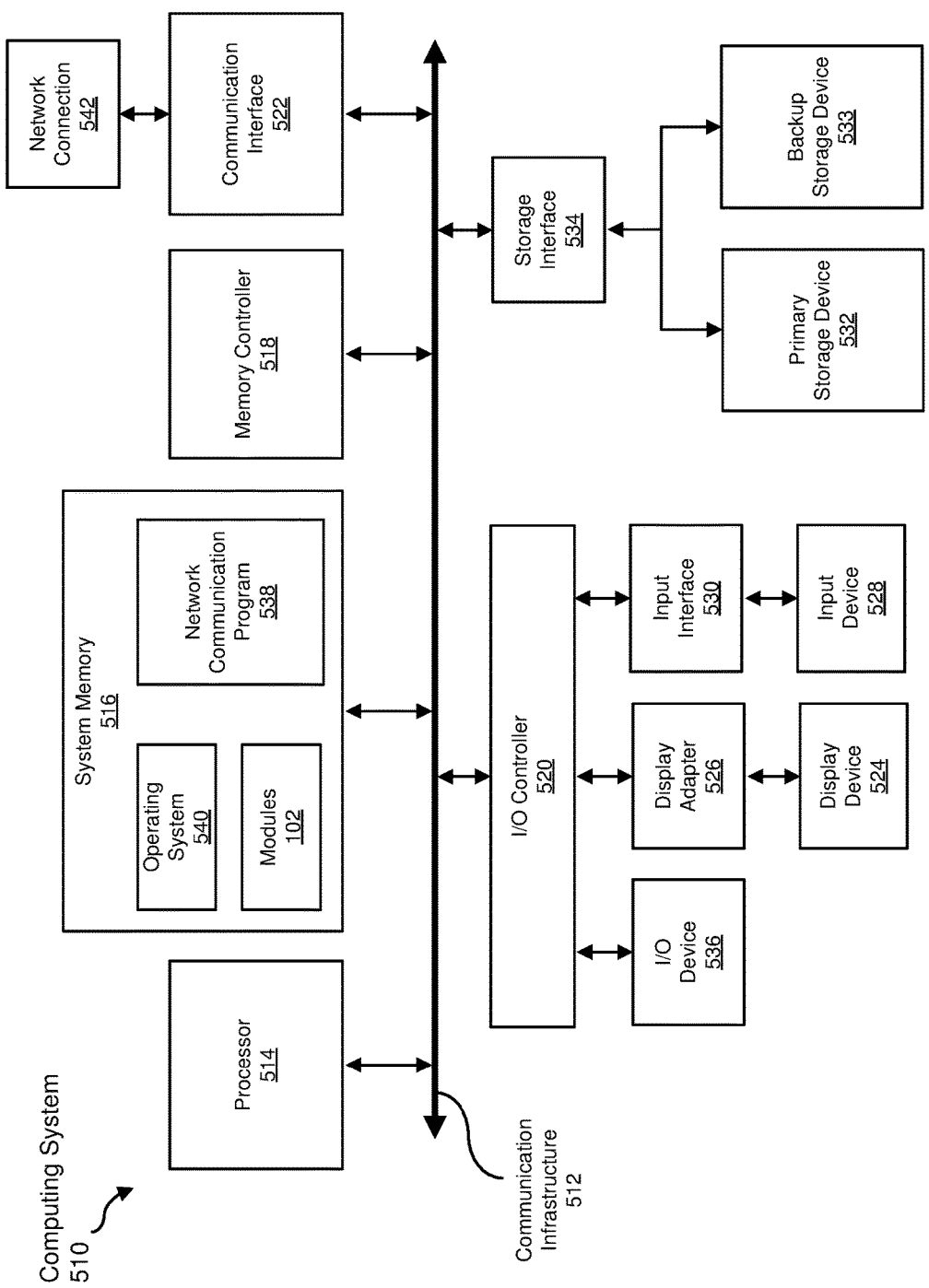
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
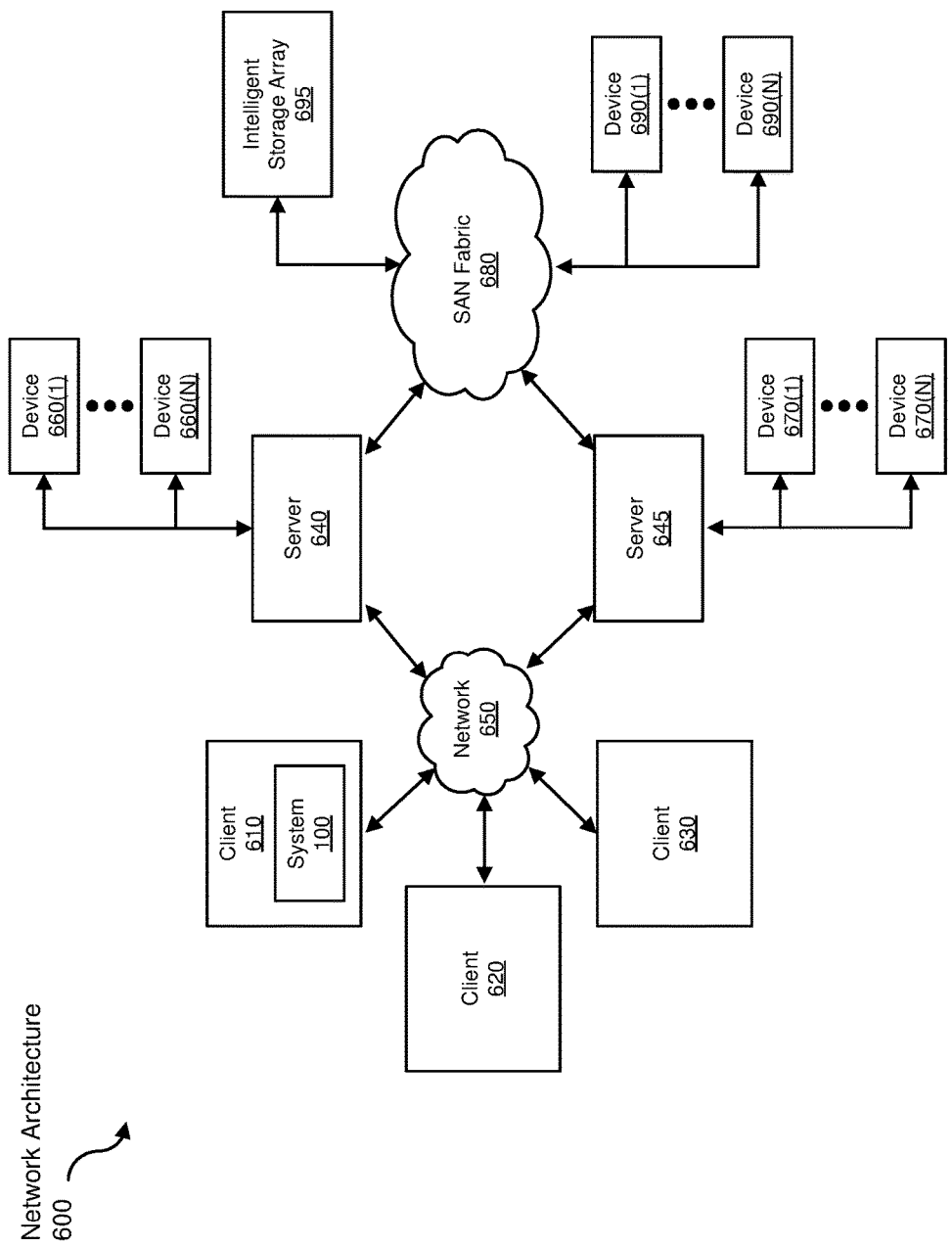
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for encrypting files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may encrypt, decrypt, and re-encrypt a file encryption key to protect a corresponding file from unauthorized access, as discussed further above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for encrypting files, at least a portion of the method being performed by a computing device comprising at least one processor, the method comprising:
    detecting an event within a network that triggers an encryption of a file on the network, the event comprising an attempt by a user account at a sending computing device to transmit the file to a receiving computing device;
    performing, in response to detecting the event:
        encrypting the file to a file encryption key; and
        encrypting the file encryption key to a public key of the user account at the sending computing device;
    receiving, by a data loss prevention server and from the receiving computing device, a file access request that includes the encrypted file encryption key, the data loss prevention server being distinct from the sending computing device; and
    performing, by the data loss prevention server in response to determining that the receiving computing device is authorized to access the file:
        initiating a decryption of the encrypted file encryption key using a private key of the user account at the sending computing device by requesting that the sending computing device perform the decryption without exposing the private key of the user account at the sending computing device to the data loss prevention server;
        re-encrypting the file encryption key using a public key of the receiving computing device; and
        transmitting the re-encrypted file encryption key to the receiving computing device to enable the receiving computing device to access the file.

2. The computer-implemented method of claim 1, wherein the data loss prevention server further functions as a cloud access security broker.

3. The computer-implemented method of claim 1, wherein the file encryption key comprises a symmetrical file encryption key.

4. The computer-implemented method of claim 1, wherein the file encryption key is randomly generated.

5. The computer-implemented method of claim 1, wherein requesting that the sending computing device perform the decryption without exposing the private key of the user account at the sending computing device to the data loss prevention server prevents compromising exclusive access by the user account to the private key of the user account.

6. The computer-implemented method of claim 1, wherein the data loss prevention server does not possess a copy of the private key of the user account.

7. The computer-implemented method of claim 1, wherein re-encrypting the file encryption key using the public key of the receiving computing device is performed in response to receiving the public key from the receiving computing device as part of the file access request.

8. The computer-implemented method of claim 1, further comprising transmitting to the receiving computing device, in response to determining that the receiving computing device is authorized to access the file, a cloud security policy that governs access to the file.

9. The computer-implemented method of claim 8, further comprising dynamically updating the cloud security policy based on at least one of:
    changing contents of the file;
    an identity corresponding to the receiving computing device;
    a time zone in which the receiving computing device is located; and
    a geolocation of the receiving computing device.

10. The computer-implemented method of claim 8, wherein the cloud security policy specifies a limit on at least one of:
    printing the file;
    copy and paste access to contents of the file;
    editing of the file; and
    offline viewing of the file.

11. A system for encrypting files, the system comprising:
    a detection module, stored in memory, that detects an event within a network that triggers an encryption of a file on the network, the event comprising an attempt by a user account at a sending computing device to transmit the file to a receiving computing device;
    a performance module, stored in memory, that performs, in response to detecting the event:
        encrypting the file to a file encryption key; and
        encrypting the file encryption key to a public key of the user account at the sending computing device;
    a reception module, stored in memory, that receives, as part of a data loss prevention server and from the receiving computing device, a file access request that includes the encrypted file encryption key, the data loss prevention server being distinct from the sending computing device;
    wherein the performance module performs, as part of the data loss prevention server and in response to determining that the receiving computing device is authorized to access the file:
        initiating a decryption of the encrypted file encryption key using a private key of the user account at the sending computing device by requesting that the sending computing device perform the decryption without exposing the private key of the user account at the sending computing device to the data loss prevention server;

re-encrypting the file encryption key using a public key of the receiving computing device; and transmitting the re-encrypted file encryption key to the receiving computing device to enable the receiving computing device to access the file; and at least one physical processor configured to execute the detection module, the performance module, and the reception module.

12. The system of claim 11, wherein the data loss prevention server further functions as a cloud access security broker.

13. The system of claim 11, wherein the file encryption key comprises a symmetrical file encryption key.

14. The system of claim 11, wherein the file encryption key is randomly generated.

15. The system of claim 11, wherein requesting that the sending computing device perform the decryption without exposing the private key of the user account at the sending computing device to the data loss prevention server prevents compromising exclusive access by the user account to the private key of the user account.

16. The system of claim 11, wherein the data loss prevention server does not possess a copy of the private key of the user account.

17. The system of claim 11, wherein the performance module re-encrypts the file encryption key using the public key of the receiving computing device in response to receiving the public key from the receiving computing device as part of the file access request.

18. The system of claim 11, wherein the performance module transmits to the receiving computing device, in response to determining that the receiving computing device is authorized to access the file, a cloud security policy that governs access to the file.

19. The system of claim 18, wherein the performance module dynamically updates the cloud security policy based on at least one of:

changing contents of the file;

an identity corresponding to the receiving computing device;

a time zone in which the receiving computing device is located; and a geolocation of the receiving computing device.

20. A non-transitory computer-readable medium comprising one or more computer-readable instructions that, when executed by at least one processor of a computing device, cause the computing device to:

detect an event within a network that triggers an encryption of a file on the network, the event comprising an attempt by a user account at a sending computing device to transmit the file to a receiving computing device;

perform, in response to detecting the event:
encrypting the file to a file encryption key; and
encrypting the file encryption key to a public key of the user account at the sending computing device;

receive, by a data loss prevention server and from the receiving computing device, a file access request that includes the encrypted file encryption key, the data loss prevention server being distinct from the sending computing device; and perform, by the data loss prevention server and in response to determining that the receiving computing device is authorized to access the file:
initiating a decryption of the encrypted file encryption key using a private key of the user account at the sending computing device by requesting that the sending computing device perform the decryption without exposing the private key of the user account at the sending computing device to the data loss prevention server;
re-encrypting the file encryption key using a public key of the receiving computing device; and
transmitting the re-encrypted file encryption key to the receiving computing device to enable the receiving computing device to access the file.

* * * * *